Dec. 22, 1925.

E. M. WRIGHT ET AL 1,566,719

REMOVABLE HANDLE FOR UTENSILS

Filed Nov. 15, 1924

INVENTORS:
ELINOR M. WRIGHT.
JOHN W. WRIGHT.
BY
ATTORNEY

Patented Dec. 22, 1925.

1,566,719

UNITED STATES PATENT OFFICE.

ELINOR M. WRIGHT AND JOHN W. WRIGHT, OF SAN FRANCISCO, CALIFORNIA.

REMOVABLE HANDLE FOR UTENSILS.

Application filed November 15, 1924. Serial No. 750,083.

*To all whom it may concern:*

Be it known that we, ELINOR M. WRIGHT and JOHN W. WRIGHT, citizens of the United States, and residents of the city and county of San Francisco and State of California, have invented certain new and useful Improvements in Removable Handles for Utensils, of which the following is a specification.

The present invention relates to removable handles for cooking, or like, utensils, and is designed to take the place of the ordinary common wooden, or wire, handles, as now constituting a part of the original bail construction, or as a replacement element in case of its destruction.

The ordinary wooden handles in common use on kitchen cooking utensils, and especially those on tea kettles and percolators, become, in time, completely burnt and charred and split away from the bail, leaving it without a means whereby it may be comfortably handled. A primary object of this invention is to construct a handle of either wood, metal, or other material, that may consist of two, or more, sections in hinged relationship adapted to be held in place upon the bail of the utensil by tensional means of a character permitting its detachment therefrom or replacement thereon.

A further object of this invention is to construct a removable handle of the character designated that, while of cheap and simple construction, shall be durable and of easy removal from and replacement upon a utensil's bail.

Other objects and advantages of this invention will appear with reference to the subjoined specification, and the accompanying one sheet of drawings, in which.

Figure 1:
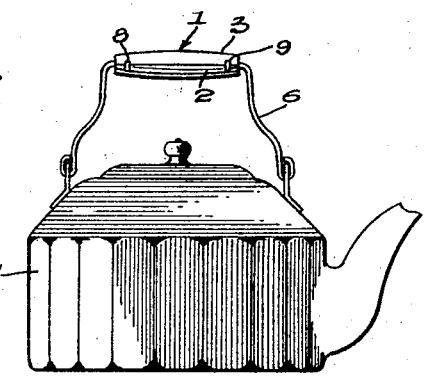
Figure 1 is an elevation of an ordinary tea kettle, showing our removable handle in place upon the bail.
Figure 4:
Figure 4 is a perspective view of a form of retaining spring element, which, in this construction, is of staple-like design.

Referring to the drawings in detail, an embodiment of our invention is shown in Figures 1 to 4 inclusive, and comprises a handle member 1 composed of two, or more, sections 2 and 3 having longitudinally arranged central grooves 4 and 5 adapted to fit around and engage loosely the bail 6 of a utensil 7. These sections may be constructed of any material, but, preferably, of those that are cheap and of low heat conductivity. The wood handle may be considered the cheapest and most practicable, since these may readily be turned on a lathe to shape and split and channeled longitudinally to form the sections 2 and 3, as clearly shown in Figure 3.

Figure 2:
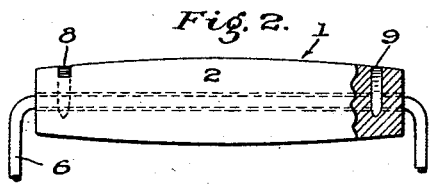
Figure 2 is an enlarged elevation, with parts broken away, to show the sectional handle and retaining spring elements.
Figure 3:
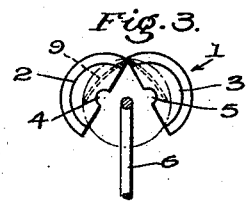
Figure 3 is an end elevation of the handles shown in Figures 1 and 2, with the sectional members thereof opened, or expanded, in readiness for removal from, or replacement upon, the utensil's bail.

The sections 2 and 3 are maintained in hinged relation by means of retaining spring elements which comprise substantially staple-like members 8 and 9 having sharpened points adapted to be driven, or otherwise set, into the sections, as shown in Figures 2 and 3, the shanks thereof being expanded somewhat before insertion, in order to bring the proper tension to bear against the sections to normally hold them in closed relationship.

Having thus described our invention, we claim, and desire to secure by Letters Patent:

A device of the character described, comprising a sectional member composed of contiguously and longitudinally disposed sections bearing, respectively, longitudinally extending grooves adapted to fit around a utensil bail, and retaining spring elements adapted to maintain said sections in hinged relationship upon said bail, said retaining spring elements comprising a pair of flat spring clips in the form of staple-like members provided with sharpened ends adapted for insertion into respective sections of said sectional member and serving as the medium through which the sections of said sectional member are maintained against each other in longitudinal alignment, the spring urge of said clips being of sufficient strength to secure the said sectional member in closed relationship upon the utensil bail.

ELINOR M. WRIGHT.
JOHN W. WRIGHT.